Figure 1:
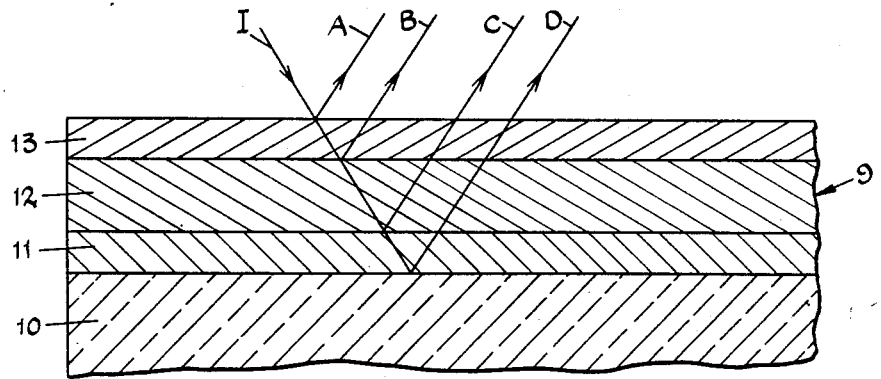

Aug. 9, 1949.   R. A. GAISER   2,478,385
MULTILAYER LOW LIGHT REFLECTING FILM
Filed Dec. 7, 1946

Inventor
Romey A. Gaiser
By Nobbe & Swope
Attorneys

Patented Aug. 9, 1949

2,478,385

UNITED STATES PATENT OFFICE 2,478,385

MULTILAYER LOW LIGHT REFLECTING FILM

Romey A. Gaiser, Toledo, Ohio, assignor to Libbey-Owens-Ford Glass Company, Toledo, Ohio, a corporation of Ohio Application December 7, 1946, Serial No. 714,871

4 Claims. (Cl. 88—1)

The present invention relates to the reduction of light reflections from the surface of, and the increase in light transmission through, transparent bodies such as glass. More particularly, this invention is concerned with a novel type of multiple layer, transparent, low light reflecting film for application to the surfaces of light transmitting bodies.

Surface reflections of light from transparent bodies, through which one is attempting to look, are objectionable from the standpoint of glare, eye strain, reduced vision and so forth. A common instance of this is encountered in trying to properly view a painting which has been mounted in a glazed frame.

Much more serious, however, are surface reflections that materially cut down the efficiency of optical instruments in which good visibility is of paramount importance. For example, the reflection of light from the surfaces of the several glass elements in a periscope, bomb sight, binoculars and so forth is a very serious problem. Such precision sighting instruments may have their light transmissions reduced to as much as 50% of the possible from this cause. In addition, the same surface reflections often create so-called "ghost images" which are particularly disturbing to the observer.

It is an aim of the present invention to greatly improve vision through transparent plates or bodies by the provision of a special kind of transparent, low light reflecting film which, when applied to a surface of glass, for example, will greatly reduce the reflection of light from the filmed surface, while at the same time increasing the transmission of light through the glass body.

Another object is to provide a multiple layer film of the above character in which each of the several layers is composed of a single compound rather than a mixture of compounds.

Another object is the provision of a film of this character which is virtually colorless and low light reflecting over the entire visible spectrum.

Still another object is the provision of such a film which will be permanent and stable, and which is relatively simple and economical to apply.

Other objects and advantages of the invention will become more apparent during the course of the following description, when taken in connection with the accompanying drawings.

Figure 2:
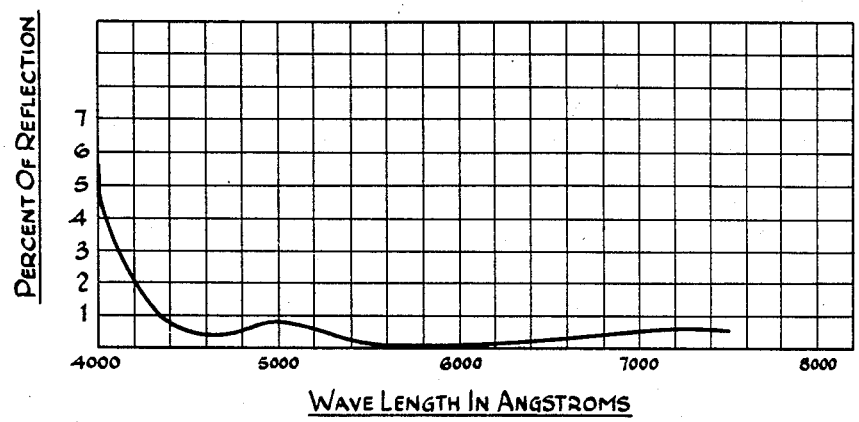

In the drawings, wherein like numerals are employed to designate like parts throughout the same:

Fig. 1 is a diagrammatic view of a glass body coated with a preferred form of my low reflecting film, and showing the action of light rays at the film face, at the interface between the several layers of the film and at the interface between the film and the glass; and Fig. 2 is a graphic view showing the theoretical curve computed from the multiple film arrangement shown in Fig. 1.

Briefly stated, the film of this invention is a three-layer one in which the thickness and indices of refraction of the three layers is so related and controlled with respect to the index of refraction of the light transmitting surface to which they are applied, that the reflection of light from said surface is materially reduced if not substantially eliminated.

To illustrate, there is shown in Fig. 1 of the drawings a preferred form of the film of the invention which can be desirably applied to a glass plate or body 10 having an index of refraction of 1.52. This film, which is designated in its entirety by the numeral 9, comprises a first layer 11 of tin oxide, ¼ wave length thick; a second layer 12 of titanium dioxide, ½ wave length thick; and a third or top layer 13 of silicon dioxide, ¼ wave length thick.

This particular film on a transparent glass body having an index of refraction of 1.52 will be stable, durable, substantially colorless, and low light reflecting over the entire visible spectrum.

To give a better idea of just what happens when the glass surface is coated in this manner; according to Fresnel's law, at normal incidence the refractive index alone determines the amount of light reflected from a body. Therefore, if light in an air medium of refractive index 1.0 is reflected from a glass surface of refractive index 1.52, the amplitude of the reflected light is $$\frac{1.52-1}{1.52+1}$$

or .206. Stannic oxide has a refractive index in the massive state of 1.99. In the thin film state, this refractive index would be reduced to approximately 1.8. When a film of stannic oxide is placed on the above glass surface, two reflected waves are produced. The first from the air-film boundary has an amplitude of $$\frac{1.8-1}{1.8+1}$$

or .285. The second from the film-glass boundary has an amplitude of $$\frac{1.80-1.52}{1.80+1.52}$$

or .084. Whether or not the reflected wave from the film-glass boundary interferes or reinforces the wave from the air-film boundary is determined by film thickness and the phase change that occurs at these boundaries.

Similarly, titanium dioxide has a refractive index in the massive state of approximately 2.6. In a thin film state this refractive index approximates 2.4. Silica and quartz refractive indices vary between 1.41 and 1.55 in the massive state, but for film computation the refractive index of 1.45 is usually chosen.

Now with the arrangement shown in Fig. 1, a glass body of refractive index 1.52 has deposited on one of its surfaces in the following order: a film of stannic oxide having an optical thickness of 1400 angstroms and a refractive index of 1.8, a film of titanium dioxide having an optical thickness of 2800 angstroms and a refractive index of 2.4, and a film of silica having an optical thickness of 1400 angstroms and a refractive index of 1.45. This three-layer film will produce four reflected light waves having the following amplitudes: .084 from the glass-stannic oxide boundary; .143 from the stannic oxide-titanium dioxide boundary; .247 from the titanium dioxide-silica boundary; and .183 from the silica-air boundary.

If light (indicated at I) of wave length 5600 angstroms impinges at or near normal incidence on this multiple film surface, the first light (designated A) reflected from the air-silica boundary will suffer a phase change because the light is traveling from a less dense to a more dense optical medium. The remainder of the light will pass through the silica film until it strikes the silica-titanium dioxide interface.

At this point, another portion of the light B will be reflected. It will also undergo a phase change for the reason stated above and will arrive at the air boundary one-half wave length behind the impinging light. The remainder of the light will travel through the titanium dioxide film until it strikes the titanium dioxide-stannic oxide interface. At this point, still another portion of the light C will be reflected. This portion will not have undergone a phase change, but it will arrive at the air boundary $3/2$ wave lengths behind the impinging light.

The remainder of the light will travel though the stannic oxide film until it strikes the stannic oxide-glass interface. At this point, another portion D will be reflected which also does not suffer a phase change, but will arive at the air boundary $4/2$ wave lengths behind the impinging light.

In other words, if minus signs are assigned to these amplitudes for an 180° change of phase and for odd number of one-half wave length retardations, the amplitude of the wave A from the air-silica boundary will become —.183; the amplitude of the wave B from the silica-titanium dioxide boundary will become +.247; the amplitude of the wave C from the titanium dioxide-stannic oxide boundary will become —.143; and the amplitude of the wave D from the stannic oxide-glass boundary will become +.084. If these amplitudes are now added the total becomes +.005. Since the square of the amplitude=reflection, the reflection from this multiple film combination for light of 5600 angstroms becomes .0025%.

The statements above may be shown in tabular form as follows:

| Amplitude | Formula | Value | Sign Change due to— | | Resultant Amplitude and Sign |
|---|---|---|---|---|---|
| | | | Refractive Index | Film Thickness | |
| A | $\frac{1.45-1}{1.45+1}$ | .183 | — | | —.183 |
| B | $\frac{2.4-1.45}{2.4+1.45}$ | .247 | — | — | +.247 |
| C | $\frac{2.4-1.8}{2.4+1.8}$ | .143 | + | — | —.143 |
| D | $\frac{1.8-1.52}{1.8+1.52}$ | .084 | + | + | +.084 |

If the well known vector methods of film analysis are applied to this combination of film it will be seen that a low reflectance of light is maintained throughout the visible spectrum. This is demonstrated in the graphical analysis of this film combination shown in Fig. 2.

Obviously, the special, multiple layer film of this invention is not limited to any specific method or procedure for applying the several layers. Generally speaking, whenever it is possible to do so I prefer to use the so-called fuming method; particularly when, as is shown in Fig. 1 of the drawing, the preferred form of film is applied to the surface of glass having an index of refraction of 1.52.

However, in filming plastics, or glasses, glazes or ceramic articles having different indices of refraction, or in applying film layers of different compositions, other methods of application may be used, including thermal evaporation in vacuum.

For the purpose of illustration a set of procedures for applying the film shown in the drawing to a plate of ordinary soda-lime-silica plate or sheet glass is set forth below:

The initial coating of tin oxide ¼ wave length thick can be applied to a plate of ordinary soda-lime-silica glass which has a refractive index of 1.52 by any of the methods described in the application of Harold A. McMaster, Serial No. 460,838, filed October 5, 1942, now Patent 2,429,420, dated October 21, 1947, or in the application of Romey A. Gaiser and Harold A. McMaster, Serial No. 513,144, filed December 6, 1943, or in either of the applications of Romey A. Gaiser, Serial Nos. 654,473 and 654,474, filed March 14, 1946. Ordinarily, I prefer to use a method wherein the glass sheet after cleaning is heated to substantially its point of softening and then exposed to the fumes of stannic tetrachloride.

The second or intermediate layer of titanium dioxide ½ wave length thick may be conveniently applied by the method described in the application of Romey A. Gaiser, Serial No. 493,358, and which consists essentially in exposing a heated surface to be coated to the fumes of titanium tetrachloride.

A method by which the third or final layer of silicon dioxide may be applied on the second or intermediate layer is described in British Patent 569,857 to Pilkington Brothers Limited. Other methods are: fuming with the vapors of silicon tetrachloride; dipping in tetra ethyl silicate; or by bubbling dry air through methyl silicate and then into a burner type nozzle with a stream of 25% hydrogen and 75% air, burning the gas as it issues from the nozzle and directing it toward the surface to be coated with silica.

It is to be understood that the form of the invention herewith shown and described is to be taken as the preferred embodiment of the same, but that various changes in materials and thicknesses of film layers may be resorted to without departing from the spirit of the invention or the scope of the subjoined claims. For example, in producing a low reflecting film on the surfaces of bodies of glass having an index of refraction of 1.52, a transparent layer of a single compound other than tin oxide and having a refractive index of approximately 1.8 might be substituted for the lower or glass contacting layer. Similarly, other materials, like zinc sulphide, which have an index of refraction of approximately 2.4, may be substituted for the titanium oxide in the second or middle layer; and another material of similar refractive index, such as calcium fluoride (1.44) can be substituted for the silica in the third or top layer.

Moreover, comparable results in the way of low light reflection from the surfaces of glass, or other bodies, having indices of refraction other than 1.52, can be obtained with the multiple, single compound, layer films of the invention by proper control of the thickness and refractive indices of the several layers of the films.

I claim:

1. The combination with a body having a normally light reflecting surface and a refractive index of approximately 1.52, of a transparent substantially colorless multiple layer reflection reducing film on said surface comprising a transparent first layer of a single compound material approximately ¼ wave length thick and having an index of refraction of approximately 1.8, a second transparent layer on said first layer approximately ½ wave length thick of a material having a refractive index of approximately 2.4, and a third transparent layer on said second layer approximately ¼ wave length thick of a material having a refractive index of approximately 1.45.

2. A transparent substantially colorless multiple layer film for reducing light reflection from a surface of a body having a refractive index of approximately 1.52 comprising a first transparent layer of a single compound material having an optical thickness of approximately 1400 angstroms and a refractive index of approximately 1.8, a second transparent layer of a single compound material having an optical thickness of approximately 2800 angstroms and an index of refraction of approximately 2.4 on said first layer, and a third transparent layer of a single compound material having an optical thickness of approximately 1400 angstroms and a refractive index of approximately 1.45. on said second layer.

3. The combination with a body having a normally light reflecting surface and a refractive index of approximately 1.52, of a transparent substantially colorless multiple layer film on said surface comprising a transparent first layer of stannic oxide of an optical thickness of approximately 1400 angstroms, a second transparent layer of titanium dioxide on said first layer and having an optical thickness of approximately 2800 angstroms, and a third transparent layer of silica on said second layer and having an optical thickness of approximately 1400 angstroms.

4. The combination with a body having a normally light reflecting surface and a refractive index of approximately 1.52, of a transparent substantially colorless multiple layer film on said surface comprising a transparent first layer of stannic oxide of an optical thickness of approximately 1400 angstroms, a second transparent layer of a material having an optical thickness of approximately 2800 angstroms and an index of refraction of approximately 2.4 on said first layer, and a third transparent layer of a material having an optical thickness of approximately 1400 angstroms and a refractive index of approximately 1.45 on said second layer.

ROMEY A. GAISER.

REFERENCES CITED

The following references are of record in the file of this patent:

UNITED STATES PATENTS

| Number | Name | Date |
| --- | --- | --- |
| 2,281,474 | Cartwright et al. | Apr. 28, 1942 |
| 2,331,716 | Nadeau et al. | Oct. 12, 1943 |
| 2,379,790 | Dimmick | July 3, 1945 |
| 2,397,929 | Dimmick | Apr. 9, 1946 |
| 2,412,496 | Dimmick | Dec. 10, 1946 |
| 2,422,954 | Dimmick | June 24, 1947 |

OTHER REFERENCES

Cartwright et al., Publ. Physical Review, June 1, 1939, volume 55, page 1128.